United States Patent [19]

Chin et al.

[11] 4,276,969
[45] Jul. 7, 1981

[54] METHOD AND MEANS FOR FASTENING FRICTION WEAR PADS

[75] Inventors: Robert W. Chin, Akron, Ohio; Walter J. Krause, Bradenton, Fla.

[73] Assignee: Goodyear Aerospace Corporation, Akron, Ohio

[21] Appl. No.: 15,260

[22] Filed: Apr. 2, 1979

[51] Int. Cl.³ .............................................. F16D 65/10
[52] U.S. Cl. ........................ 188/218 XL; 188/250 G; 192/107 R; 219/94
[58] Field of Search .............. 188/73.2, 73.1, 218 XL, 188/250 G, 250 B; 192/107 R, 70.13; 219/94

[56] References Cited

U.S. PATENT DOCUMENTS

| | | | |
|---|---|---|---|
| 1,039,137 | 9/1912 | Johnson | 219/94 |
| 3,064,782 | 11/1962 | DuBois | 192/107 R |
| 3,710,914 | 1/1973 | Lowey et al. | 188/218 XL X |
| 3,913,716 | 10/1975 | Sedlock | 188/218 XL X |

Primary Examiner—Douglas C. Butler
Attorney, Agent, or Firm—P. E. Milliken; L. A. Germain

[57] ABSTRACT

In a friction component for brakes, clutches and the like, a core member is adapted for carrying a plurality of friction pads or cups on either or both of its surfaces. According to this invention a cylindrical metal bushing is positioned in an aperture through the core member to contact the bottoms of friction pads on the opposite surfaces of the core. The bushing has annular projections at the ends that make contact with the bottoms of the friction pads and passage of an electrical welding current through the assembly affects welding of the bushing projections to the bottoms of the pads and rigidly secures them to the core member.

4 Claims, 9 Drawing Figures

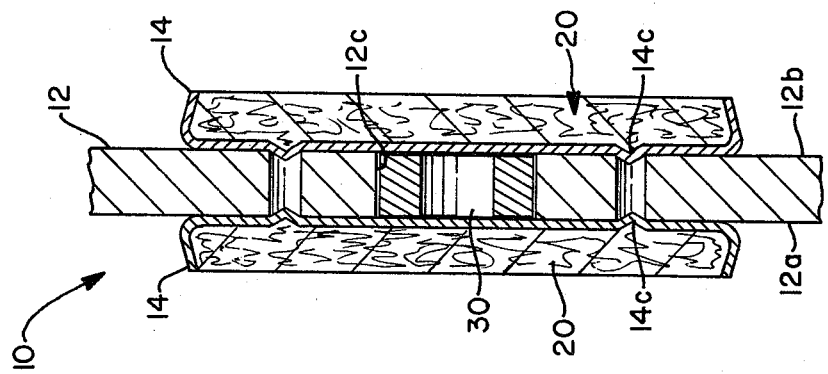
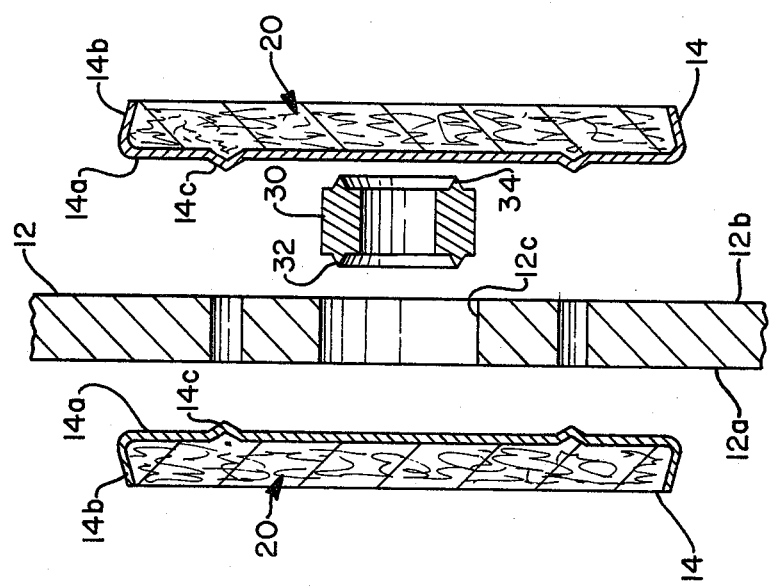
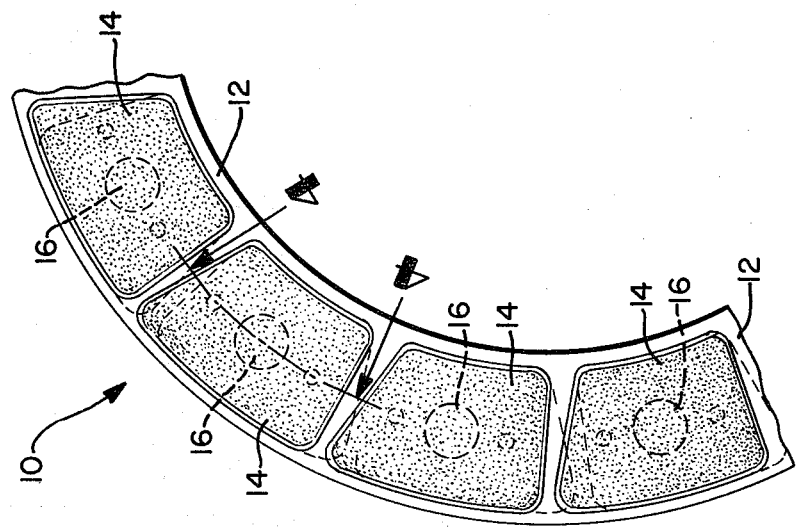

METHOD AND MEANS FOR FASTENING FRICTION WEAR PADS

BACKGROUND OF THE INVENTION

This invention generally relates to disk brakes, clutches and the like, and more particularly to a method and means for fastening friction wear pads or cups to opposite faces of a disk core member. The cups contain a body of embedded friction material which may be any of the well known metallic friction lining materials including sintered friction materials.

Heretofore, when two wear pads of friction material were mounted on opposing faces of a disk core, they were attached by means of various type fasteners including snap type fasteners, rivets, force-fit fasteners and the like. Prior art fasteners of the type alluded to are illustrated in the drawing FIGS. 1(a)–1(f) of FIG. 1. FIGS. 1(a) and 1(c) show snap and force-fit fasteners respectively, and these types are generally not suitable in harsh environments such as for example, aircraft and heavy equipment environments, because they tend to loosen under the extremes of temperature, especially under the high heat associated with braking of these type vehicles. Loose wear pads are subject to uneven pressure across the face of the friction material causing uneven wear and thus a requirement for premature replacement. FIG. 1(b) illustrates the application of rivets to mounting to the wear pads and in this case an access hole must be provided in the friction material so that the rivet may be inserted therein and through the core member to the opposite pad. Holes in the friction material reduce the area of the friction surface available and also tend to cause an uneven pressure distribution over the face of the material which results in uneven and increased wear and again a requirement for premature replacement. FIG. 1(e) illustrates spot welding of the friction pads wherein a depression on the bottom of one pad is in intimate contact with a like depression in another pad mounted on the opposite surface of the core and electrodes are positioned within the two interconnected depressions such as to effect a spot weld of the two pads. In this instance, access holes must also be provided in the friction material so that electrodes may be inserted in each pad depression. Holes in the friction material have adverse wear effects as herebefore stated with respect to the rivet configuration of FIG. 1(b). FIG. 1(d) illustrates a resistance welded assembly wherein the friction pads are again formed with a depression in the bottom surface such that when two pads are mounted on opposite faces of the core member, the depressions are in intimate contact within an access hole in the core. In this instance, a sintered metallic friction lining material is embedded in the pad cup with a metal plug seated within the depression such that a complete current path exists from the surface of the friction material on one side of the core to the surface of the friction material on the opposite side of the core. Electrodes placed on the surfaces of the friction material effect a current through the assembly such that the contacting depressions are resistance welded together. A disadvantage of this technique is the fact that the weld in the area of the depressions is a small area contact and the pads must be carefully positioned so as to be welded in faced parallel alignment. Furthermore, the depressions must be of the proper depth for a particular core thickness and metal plugs or inserts must be positioned in the depressions such that a current path exists between the two. FIG. 1(f) shows another embodiment wherein steel buttons are first welded to the bottoms of the wear pads and these are then inserted in a core access hole and resistance welded together. A disadvantage of this technique is the fact multiple weld operations are required and the weld contact area is small. Furthermore, the depth of the buttons at the first weld must be maintained such that parallelism of the pads on the core is not affected during the second weld and the pads are securely affixed to the core. Descriptions and details of the above-mentioned prior art may be had in the following respective U.S. Pat. Nos.: 4,076,106; 3,724,614; 3,710,914; 3,913,716; and 3,982,612.

An object of the present invention therefore is to provide a friction component for brakes, clutches and the like, wherein a friction pad is provided having a continuous friction surface across its face and a flat bottom surface to provide an increased friction surface area and depth of friction material.

Another object of the invention is to provide friction pads on opposing surfaces of a disk core member that are projection welded in a manner to give a greater contact weld area between the two pads and thus a more stable mounting on the core.

Still another object of the invention is to provide a metallic bushing for projection welding of the opposing friction pads such that they may be applied to any thickness core member by merely changing the length of the bushing.

The invention further provides weld bushings that may be increased in diameter for an increased stable mounting of the friction pads on the core member.

SUMMARY OF THE INVENTION

The beforementioned objects and advantages of the invention are met and accomplished in a method and means for fastening friction pads to opposing surfaces of a core member wherein a cylindrical metal bushing having annular projections on its ends is positioned in an access hole through the core such as to make intimate contact with the bottom surfaces of the friction pads. Passage of a weld current through the assembly of pads and bushing effects a ring weld of the bushing projections to the bottoms of the friction pads.

BRIEF DESCRIPTION OF THE DRAWINGS

FIG. 2 is a partial plan view of a friction core member having disk wear pads mounted thereon in accordance with the teaching of this invention;

FIG. 3 is a cross-sectional elevational view of the assembly comprised of two friction pads and a bushing member prior to being projection welded on the core member; and FIG. 4 is an enlarged cross-sectional elevational view as taken on line 4—4 of FIG. 2 upon completion of projection welding the assembly onto the core member.

BRIEF DESCRIPTION OF THE INVENTION

Figure 1:
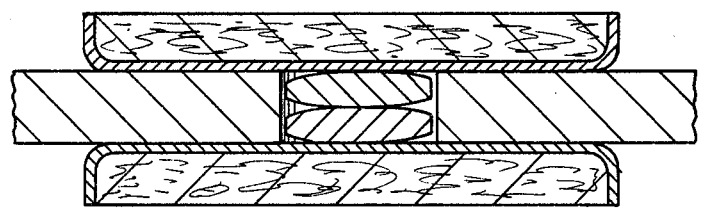
FIG. 1 illustrates the teaching of the prior art as exemplified in FIGS. 1(a)–1(f)
Figure 1:
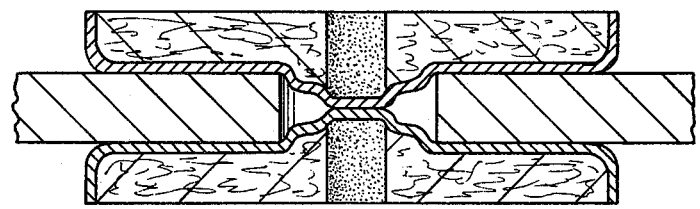
Figure 1:
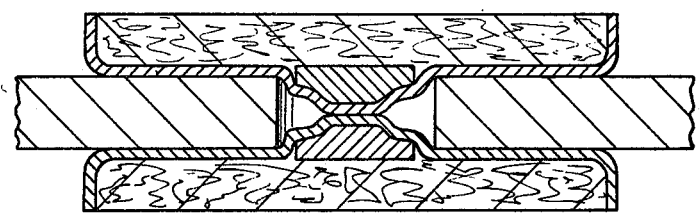
Figure 1:
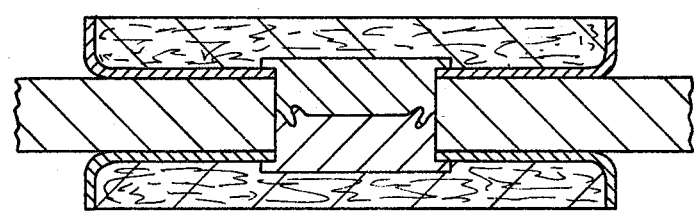
Figure 1:
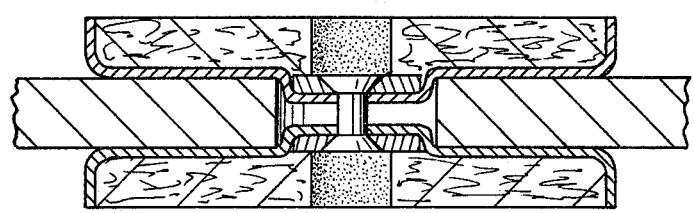
Figure 1:
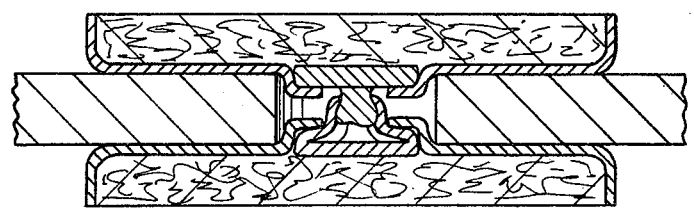

Referring to FIG. 2, a portion of a friction component is generally indicated by reference numeral 10 and comprises a core member 12 and plurality of attached friction pads 14. The core 12 is a circular disk which may be one of a plurality of such disks in a disk stack arrangement such as to effect a braking or clutching action. In this instance, the core member 12 may be either a rotor or stator in the stack, depending on the arrangement and configuration of the total assembly comprising the brake or clutch, and this is well known and understood by those persons knowledgeable of the art. The pads 14 are affixed to the core 12 on both surfaces 12a and 12b thereof by fastening means 16 interconnecting two opposing pads mounted on opposite faces of the core. The pads are shown as having a particular configuration; however, the invention may be applied to any shape, size or configuration of friction pad which may be used in this type application.

In accordance with this invention and as illustrated in FIGS. 3 and 4, the pads 14 are of a cup-like configuration having a substantially flat bottom 14a and side walls 14b that may or may not be tapered inwardly toward the friction material generally indicated by reference numeral 20. The bottom surface of the pad 14 may include means such as depressions 14c that serve as antirotational devices which engage holes or recesses in the core surface when the pad is mounted thereon. As is the practice in the art, the core member 12 is provided with a plurality of holes 12c therethrough which receives the pad mounting means 16 therein.

Now therefore, and in accordance with this invention, a bushing member 30 is provided to be positioned within the access hole 12c in the core member 12 for interconnecting friction pads 14 placed on opposing surfaces 12a, 12b of the core. The bushing 30 is a cylindrical shaped steel piece having an O.D. that substantially corresponds to the I.D. of the access hole 12c within the core. The bushing 30 is characterized by annular projections 32, 34 on the ends thereof that have a substantially triangular cross-section as shown in FIG. 3 and the overall length of the bushing when placed in the access hole 12c is slightly greater by the height of the projections 32, 34 than the bore length of the hole 12c. Thus, when a bushing is positioned in the access hole and two friction pads 14 are mounted on the opposite faces of the core over the bushing and a welding current applied to the assembly which penetrates the assembly from one surface to the other in the area of the bushing, the assembly pads and bushing are integrally welded together at the interface of the bushing projections 32, 34 and the bottoms of the two opposing pads. From the foregoing it will be appreciated that the bushing, by virtue of its diameter and the annular projections 32, 34 provides a substantially more stable mount for the friction pads 14 than herebefore provided by the prior art devices. Furthermore, the friction pads 14 may all be formed in an identical configuration and applied to any thickness core member 12 by merely using the proper length bushing member 30. The bushing may be made of any wall thickness but a diameter-to-wall thickness ratio of at least 3:1 provides a suitable stable connection between welded pads. Also, for friction pads having larger surface areas, the diameter of the bushing may be increased to provide a proper base support connection when mounted on the core member and in this case the bushing diameter-to-wall thickness ratio may be increased.

While certain representative embodiments and details have been shown for the purpose of illustrating the invention, it will be apparent to those skilled in the art that various changes and modifications may be made therein without departing from the spirit or scope of the invention.

We claim:

1. A friction component comprising:
   a substantially disk-like core member having a plurality of mounting apertures formed therein at a specific distance from the core axis and at equal angular positions about the core member;
   a plurality of cup-like friction pads containing friction material within the cup mounted on opposite face surfaces of the core member, two such pads in mutual base-to-base alignment with one of said apertures; and
   a plurality of substantially cylindrical metal bushings each positioned in one of said mounting apertures, said bushings having a diameter to wall thickness ratio equal to at least 3:1 and having annular projections at the ends thereof that are substantially triangular in cross-section and extend the total bushing length beyond the core aperture by an amount equal to the projections, said projections being in contact with respective bases of two aligned pads such that upon subjection to an electric welding current said pads and associated bushings are intimately resistance welded at the interface of the annular bushing projections and the pad bases and thus securely affixed to the core member.

2. The friction component as set forth in claim 1 wherein the length of the bushing is greater than its diameter.

3. The friction component as set forth in claim 1 wherein the diameter of the bushing is greater than its length.

4. A method of fabricating a friction component comprised of a disk-like core member having a plurality of mounting apertures therein and a plurality of friction pads mounted on opposite face surfaces of the core member, two such pads being in base-to-base alignment with one of said apertures comprising the steps of:
   providing a plurality of substantially cylindrical steel bushings having annular projections that are substantially triangular in cross-section on the ends, said bushings having a diameter to wall thickness ratio equal to at least 3:1 and an overall length greater than the thickness of the core member by the amount of the projections;
   inserting a bushing in each of said mounting apertures;
   positioning a friction pad on opposite face surfaces of the core member in a base-to-base alignment with one of said apertures such that the end projections of the bushing are in contact with the respective pads; and
   applying a welding current to said base-to-base aligned pads such that the bushing and associated pads are intimately resistance welded at the interface of the pad bases and bushing projections.

* * * * *